United States Patent
Du

(10) Patent No.: US 9,569,386 B2
(45) Date of Patent: Feb. 14, 2017

(54) METHOD AND SYSTEM FOR SINGLE-LINE INTER-INTEGRATED CIRCUIT (I2C) BUS

(71) Applicant: NXP B.V., Eindhoven (NL)

(72) Inventor: David Alan Du, Scottsdale, AZ (US)

(73) Assignee: NXP B.V., Eindhoven (NL)

( * ) Notice: Subject to any disclaimer, the term of this patent is extended or adjusted under 35 U.S.C. 154(b) by 454 days.

(21) Appl. No.: 13/863,565

(22) Filed: Apr. 16, 2013

(65) Prior Publication Data

US 2014/0310436 A1 Oct. 16, 2014

(51) Int. Cl.
*G06F 13/42* (2006.01)
*G06F 13/362* (2006.01)

(52) U.S. Cl.
CPC ............ *G06F 13/362* (2013.01); *G06F 13/42* (2013.01); *G06F 13/4295* (2013.01)

(58) Field of Classification Search
USPC ........ 710/105, 106, 110, 305, 313, 314, 315
See application file for complete search history.

(56) References Cited

U.S. PATENT DOCUMENTS

| | | |
|---|---|---|
| 6,831,925 B1 | 12/2004 | Subrahmanyan et al. |
| 7,694,039 B2 * | 4/2010 | Zhang .............................. 710/33 |
| 7,755,412 B2 * | 7/2010 | Thoma .......................... 327/333 |
| 8,140,726 B2 * | 3/2012 | Kung et al. .................... 710/105 |
| 8,161,224 B2 | 4/2012 | Laurencin et al. |
| 2006/0227798 A1 | 10/2006 | Hou et al. |
| 2010/0017553 A1 * | 1/2010 | Laurencin et al. ............ 710/307 |
| 2012/0144078 A1 * | 6/2012 | Poulsen ......................... 710/105 |
| 2012/0159025 A1 | 6/2012 | Tailliet |
| 2013/0322461 A1 * | 12/2013 | Poulsen ......................... 370/458 |

FOREIGN PATENT DOCUMENTS

| | | |
|---|---|---|
| EP | 1 471 434 A1 | 10/2004 |
| EP | 2 146 287 A1 | 1/2010 |
| EP | 2 466 481 A1 | 6/2012 |
| EP | 2466481 A1 | 6/2012 |

OTHER PUBLICATIONS

Extended European Search Report for European Patent Appln. No. 14163807.2 (Aug. 18, 2014).
"I2C-bus specification and User manual"; Rev. 4; NXP Semiconductors; UM10204; pp. 1-64; Feb. 13, 2012.
"Single-Channel 1-Wire Master"; DS2482-100; Maxim Integrated; Rev. 9; pp. 1-24; Jan. 2012.
"How to Use the DS2482 I2C 1-Wire Master"; Maxim Integrated; Application Note 3684; pp. 1-20; Dec. 17, 2008.
Bairanzade, Michael; "Implement the Single Wire Protocol"; Publication No. AND8264/D; Rev. 0; pp. 1-6; May 2006.

* cited by examiner

*Primary Examiner* — Khanh Dang

(57) ABSTRACT

Embodiments of a system and method are disclosed. One embodiment is an I2C compatible device. The I2C compatible device includes an SDA interface for connection to an SDA line and a single-line I2C module configured to transmit a sync word from the SDA interface over the SDA line and following the sync word, to transmit I2C data from the SDA interface over the SDA line such that digital data is communicated via a single line. In an embodiment, the sync word is a sync byte+NACK.

15 Claims, 8 Drawing Sheets

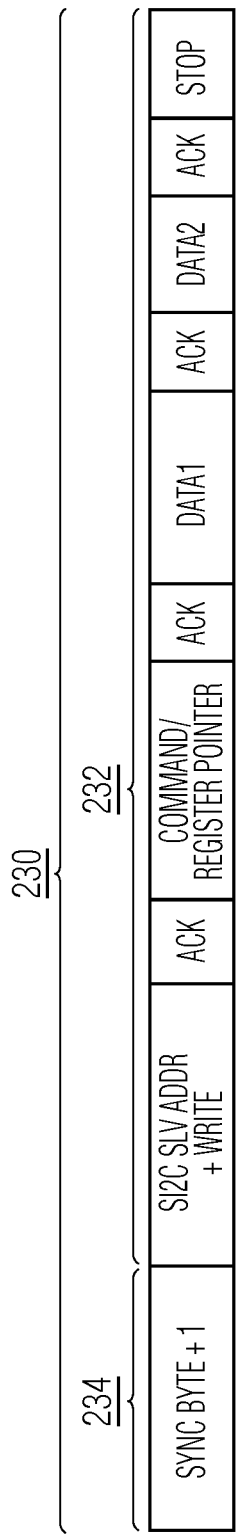
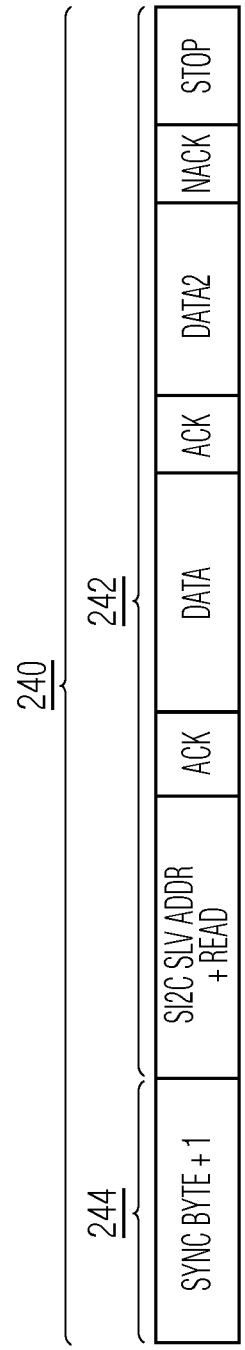
FIG. 3A
FIG. 3B

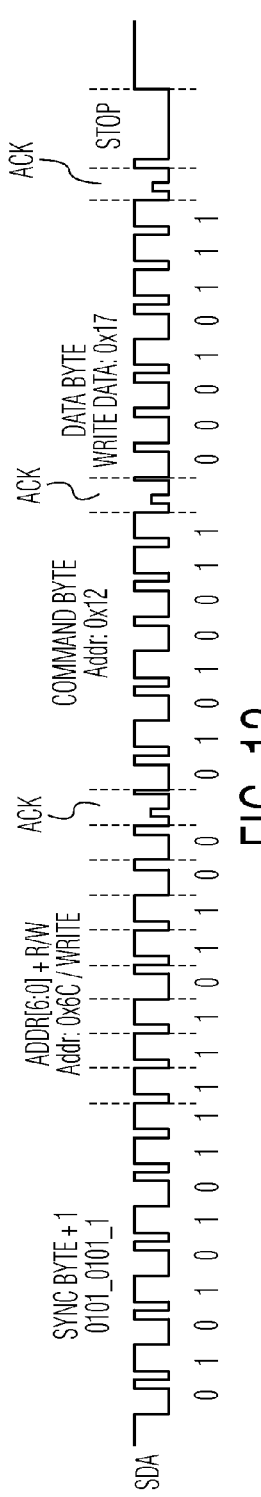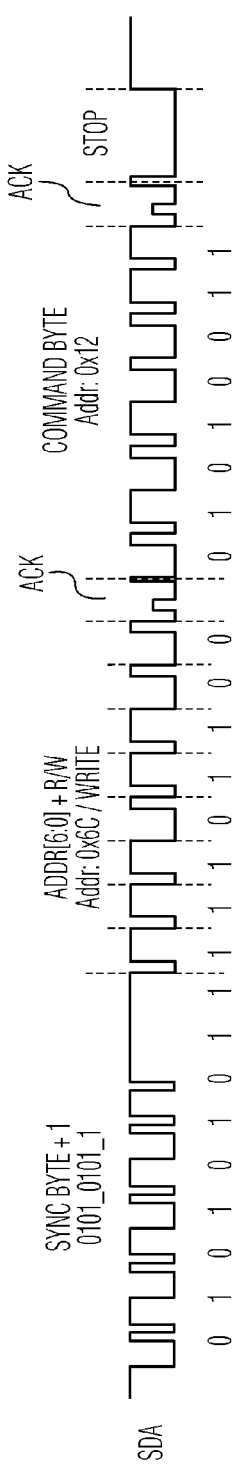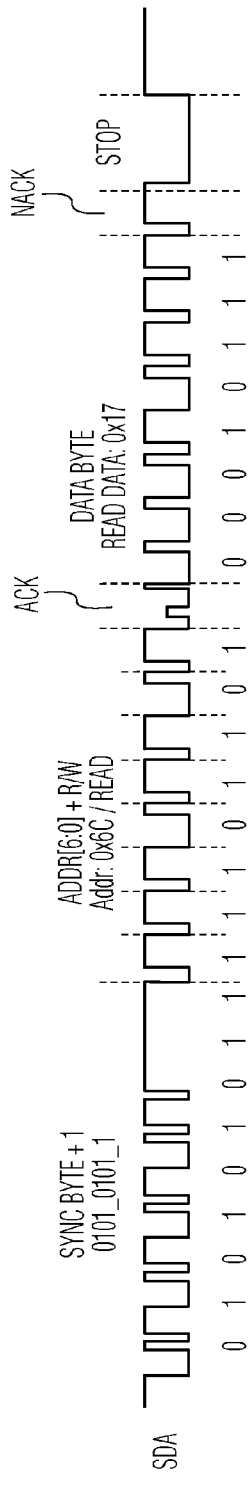
FIG. 12
FIG. 13A
FIG. 13B

METHOD AND SYSTEM FOR SINGLE-LINE INTER-INTEGRATED CIRCUIT (I2C) BUS

Philips Semiconductor (now NXP Semiconductor) has developed a bidirectional two-line bus for efficient inter-IC control. This widely adopted two-line bus is known as the inter-IC or I2C bus (also referred to as "I²C"). The I2C bus is described in detail in, for example, the "I²C-bus specification and user manual," Rev. 4, 13 Feb. 2012 ("I2C specification"), which is incorporated by reference herein. According to the I2C specification, integrated circuits (ICs) are connected by two bus lines or "wires," a serial data line (SDA) and a serial clock line (SCL). Both the SDA line and the SCL line are bidirectional lines, connected to a positive voltage supply, e.g., $V_{DD}$, via a current source or a pull-up resistor. Data is transmitted in I2C frames on the SDA line in 8-bit bytes, with each byte followed by an Acknowledge (ACK) bit or a Not Acknowledge (NACK) bit, and clocking information is transmitted on the SCL line. FIG. 1 depicts an I2C communications system 100 having a master I2C device 102 and multiple slave I2C devices 104 connected by an SDA line 106 and an SCL line 108 according to the two-line I2C specification as is known in the field.

Although the widely adopted two-line I2C bus works well, I/O pin requirements and line routing both consume valuable real estate in electronic devices. One alternative technique for implementing inter-IC communications involves placing a "bridge device" between an I2C master device and other single-line devices to implement a protocol conversion. Using this approach, the master I2C device and the bridge device communicate over a conventional two-line I2C bus and the bridge device communicates with the single-line devices via a proprietary single wire protocol, with the bridge device providing protocol conversion between the standard two-line I2C bus communications and the proprietary single wire protocol. With a continued trend towards smaller and smaller electronic devices, there is still a need for an I2C compatible bus that conserves valuable device real estate.

Embodiments of a system and method are disclosed. One embodiment is an I2C compatible device. The I2C compatible device includes an SDA interface for connection to an SDA line and a single-line I2C module configured to transmit a sync word from the SDA interface over the SDA line and following the sync word, to transmit I2C data from the SDA interface over the SDA line such that digital data is communicated via a single line. In an embodiment, the sync word is a SYNC BYTE+NACK.

In another embodiment, an I2C compatible device includes an SDA interface for connection to an SDA line and a single-line I2C module configured to recognize a sync word in digital data received at the SDA interface and upon recognizing the sync word, to decode the received digital data as I2C data.

In another embodiment, a method for communicating digital data between a master and a slave over a single line involves transmitting a sync word over the single line and following the sync word, transmitting I2C data over the single line. In an embodiment, the sync word is a SYNC BYTE+NACK.

In another embodiment, an electronic device includes a master I2C device, a slave I2C device, and an SDA line connecting the master I2C device to the slave I2C device. The master I2C device is configured to transmit a sync word over the SDA line and following the sync word, to transmit I2C data over the SDA line. The slave I2C device is configured to recognize the transmitted sync word and upon recognizing the sync word, to decode the transmitted I2C data such that digital data is communicated between the master I2C device and the slave I2C device via a single line.

Other aspects in accordance with the invention will become apparent from the following detailed description, taken in conjunction with the accompanying drawings, illustrated by way of example of the principles of the invention.

FIG. 3A depicts an I2C protocol for writing digital data from a master I2C device to a slave I2C device that includes a sync word in accordance with an embodiment of the invention.

FIG. 3B depicts an I2C protocol for reading digital data to a master I2C device from a slave I2C device that includes a sync word in accordance with an embodiment of the invention.

FIG. 12 depicts an expanded bit level view of an I2C write operation using a single-line I2C bus with edge synchronization in accordance with an embodiment of the invention.

FIGS. 13A and 13B depict expanded bit level views of I2C data in a read operation with a single-line I2C bus using edge synchronization.

Throughout the description, similar reference numbers may be used to identify similar elements.

Figure 1:
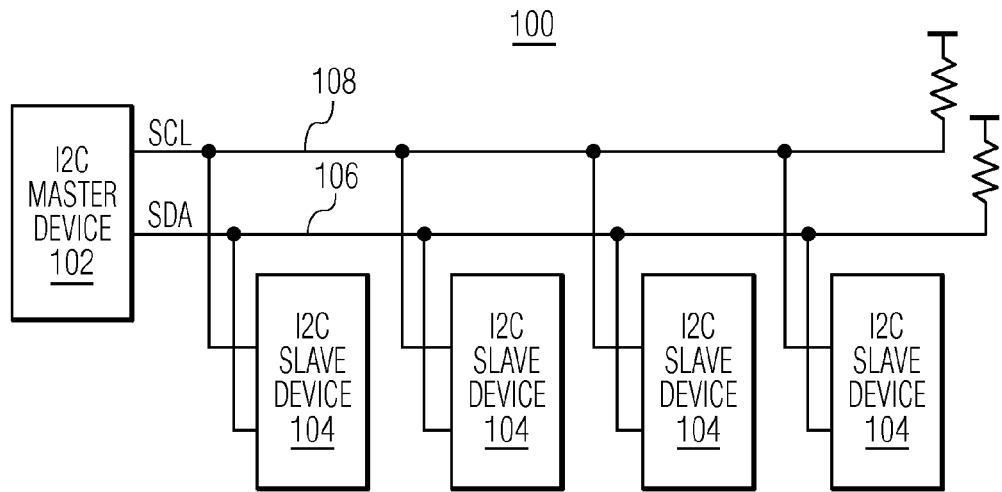
FIG. 1 depicts an I2C master device and multiple I2C slave devices connected by an SDA line and an SCL line according to the two-line I2C specification as is known in the field.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

In accordance with an embodiment of the invention, a technique has been developed that is compatible with the I2C specification but that only needs a single line, e.g., the SDA line, to communicate digital data between I2C master and I2C slave devices. The technique utilizes a synchronization word ("sync word") at the beginning of an I2C communication to provide timing synchronization for the I2C communication instead of a separate SCL line. Because the technique utilizes a sync word at the beginning of an I2C communication to provide timing synchronization instead of a separate SCL line, I2C communications can be implemented over a single line, thereby providing a single-line, or "single-wire," I2C bus. In an embodiment, the sync word is an 8-bit byte (referred to as a sync byte or a "SYNC BYTE"), followed by a 1-bit NACK. Because the sync word is an 8-bit byte followed by a 1-bit NACK, the single-line I2C bus can be implemented in conjunction with a conventional two-line I2C bus, with both the two-line and the single-line buses utilizing the same SDA line. This makes the single-line I2C bus backwards compatible with the two-line I2C bus such that both buses can be implemented within the same electronic device using the same SDA line. Additionally, use of the sync word makes the single-line I2C bus independent of the bus frequency.

Figure 2:
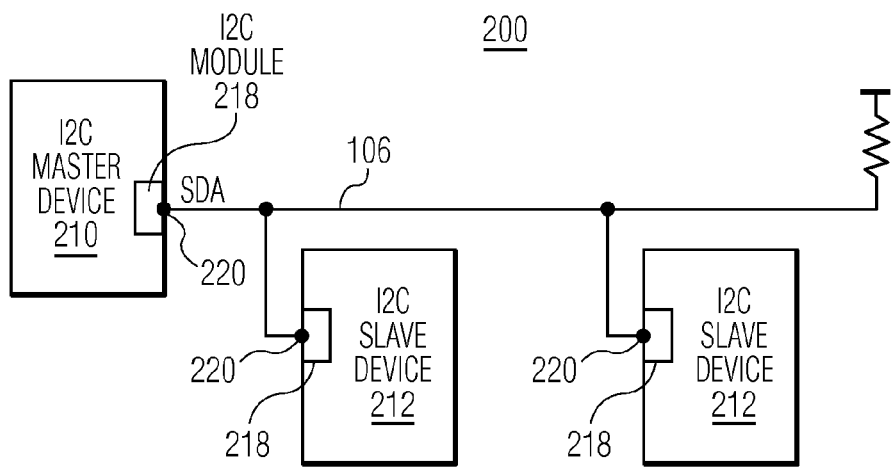
FIG. 2 depicts an embodiment of an electronic device that includes a master I2C device and multiple slave I2C devices connected by a single SDA line and that are configured to implement a single-line I2C bus.

FIG. 2 depicts an embodiment of an electronic device 200 that includes a master I2C device 210 and multiple slave I2C devices 212, all of which are connected by an SDA line 214 and configured to implement a single-line I2C bus (sI2C). In an embodiment, the master I2C device is an IC, such as a microcontroller, and the slave I2C devices are ICs such as A/D or D/A converters, general-purpose I/O expanders, LED controllers, DIP switches, serial EEPROMs, LCD drivers, real-time clock/calendars, and temperature sensors. Both the master I2C device and the slave I2C devices include a single-line I2C module 218 and an SDA interface 220, such as an SDA pin that can be connected to the SDA line. The single-line I2C modules are configured to implement the single-line I2C protocol as is described in more detail below and the modules may be embodied on an IC in hardware, software, and/or firmware. In an embodiment, the single-line I2C module of the master I2C device is configured to transmit a sync word over the SDA line, and following the sync word, to transmit I2C data over the SDA line and the single-line I2C modules of the slave I2C devices are configured to recognize the transmitted sync word, and upon recognizing the sync word, to decode the transmitted I2C frame such that digital data is communicated between the master I2C device and the slave I2C device via a single line without the need for a separate timing control line, e.g., the SCL line.

As described above, the sync word is used as the basis for timing synchronization in digital data communications between a master I2C device and a slave I2C device. Implementation of a sync word in an I2C protocol is now described with reference to FIGS. 3A and 3B. FIG. 3A depicts I2C communications 230 for writing digital data from a master I2C device to a slave I2C device that includes a sync word in accordance with an embodiment of the invention. The I2C data shown in FIG. 3A includes a portion 232 that has the same format as that called out in the I2C specification, e.g., the two-line I2C bus, and a sync word portion 234. The portion 232 includes a slave address+write field (8-bits), an ACK field (1-bit), a command/register pointer byte field (8-bits), an ACK field (1-bit), a first data byte field (8-bits), an ACK field (1-bit), a second data byte field (8-bits), an ACK field (1-bit), and a STOP field. The slave address+write field and the command/register pointer byte field are described in more detail with reference to FIGS. 4, 6, and 10. It should be noted that some portions of the protocol frame are sent by the master I2C device and other portions of the protocol frame are sent by the slave I2C device as described in the I2C specification. For example, the slave address+write field (8-bits), the command/register pointer byte field (8-bits), the first data byte field (8-bits), the second data byte field (8-bits), and the STOP field in FIG. 3A are sent by the master I2C device and the ACKs are sent by an I2C slave device.

FIG. 3B depicts I2C communications 240 for reading digital data from a slave I2C device to a master I2C device, in which the I2C frame also includes a sync word in accordance with an embodiment of the invention. The I2C data shown in FIG. 3B includes a portion 242 that has the same format as that called out in the I2C specification, e.g., the two-line I2C bus, and a sync word 244. The portion 242 includes a slave address+read field (8-bits), an ACK field (1-bit), a first data byte field (8-bits), an ACK field (1-bit), a second data byte field (8-bits), a NACK field (1-bit), and a STOP field. The read frame may include more data fields depending on the size of the data read. Again, it should be noted that some portions of the protocol frame are sent by the master I2C device and other portions of the protocol frame are sent by the slave I2C device as described in the I2C specification. For example, the slave address+read field (8-bits), some ACKs, and the STOP in FIG. 3B are sent by the master I2C device and the first ACK and the first and second data bytes are sent by a slave I2C device.

Figure 4:
FIG. 4 depicts an expanded view of the slave address+write/read field of FIGS. 3A and 3B.

FIG. 4 depicts an expanded view of the slave address+ write/read field of FIGS. 3A and 3B. As shown in FIG. 4, the slave address is carried in bits [6:0] and bit [7] indicates whether the I2C frame is a write frame or a read frame, where 0=Write and 1=Read. The format of the slave address+write/read field is the same as in the I2C specification, e.g., the two-line I2C bus.

Figure 5:
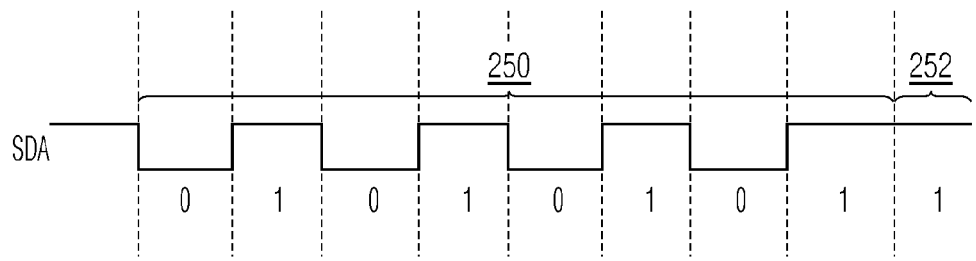
FIG. 5 depicts an embodiment of the sync word from FIGS. 3A and 3B.

Referring back to FIGS. 3A and 3B, in an embodiment, the sync word portions 234 and 244 of the I2C communications include a sync byte field (8-bits) and a Not Acknowledge (NACK) field (1-bit). The sync word is used for timing synchronization in the single-line I2C bus as described below. FIG. 5 depicts an expanded bit level view of an embodiment of the sync words 234/244 from FIGS. 3A and 3B that includes the sync byte and NACK as a bit string of "010101011" in a case where the SDA line is initially held high. As shown in FIG. 5, the sync word includes an 8-bit SYNC BYTE 250 (bit string "01010101") and a 1-bit NACK bit "1") 252. In an embodiment, the bit string of the sync byte is reserved such that it is not part of the slave address space. In operation, when the sync word is transmitted from a master I2C device, the reserved value of the sync byte is recognized by the single-line I2C module 218 as a valid I2C address. Once recognized as a valid I2C address, the subsequent I2C data is decoded and the corresponding write/read operation is implemented. For example, the I2C data is decoded as described in the I2C specification to identify the slave address, the read/write command, the command/register pointer field, the data fields, the ACKs/NACKs, and any STOP commands.

Because the sync word is an 8-bit sync byte plus a 1-bit NACK, the sync word is fully compatible with the two-line I2C specification in that any I2C device will recognize the sync word as a byte plus an ACK/NACK and react accordingly. For example, if the sync word is received by a slave I2C device that is not configured for single-line I2C operation, the slave I2C device will treat the sync byte as a non-matching slave address and simply disregard the corresponding data. In an embodiment, the Sync Byte+NACK is 9 bits so that the sync word follows the I2C specification of 8 bits+ACK/NACK. The last bit of the Sync Byte+NACK is a NACK or "1" because a single-line slave I2C device should not react to a two-line I2C communication that has the same address as the first 8 bits of the Sync Byte+1, e.g., 0101_0101. In an embodiment, if a master I2C device tries to address a two-line I2C device with 0101_0101, the two-line slave I2C device will ACK, causing the $9^{th}$ bit to be a "0." The bitstream would look like 0101_0101_0. In contrast, a single-line I2C device (sI2C) will not react to this bitstream, because the single-line I2C device is looking for 0101_0101_1.

The sync word 234/244 in an I2C communication can be used to implement the single-line I2C bus according to a time synchronization protocol or an edge synchronization protocol. An embodiment of a technique for implementing the single-line I2C bus utilizing a time synchronization protocol is described below with reference to FIGS. 6-9B and a technique for implementing the single-line I2C bus utilizing an edge synchronization protocol is described below with reference to FIGS. 10-13B.

Figure 6:
FIG. 6 depicts an expanded view of the command/pointer register byte field of the write frame from FIG. 3A for use with a time synchronization protocol.

FIG. 6 depicts an expanded view of the command/pointer register byte field of the write data 230 from FIG. 3A for use with a time synchronization protocol. As shown in FIG. 6, bits [6:0] are used to carry the register address to which data will be written and bit [7] carries a byte count command (Byte CNT), where 0=one byte write and 1=two byte write. In this embodiment, the time synchronized writes are limited to two bytes in order to ensure that the timing synchronization does not drift into an unreliable range due to clock drift.

Figure 7:
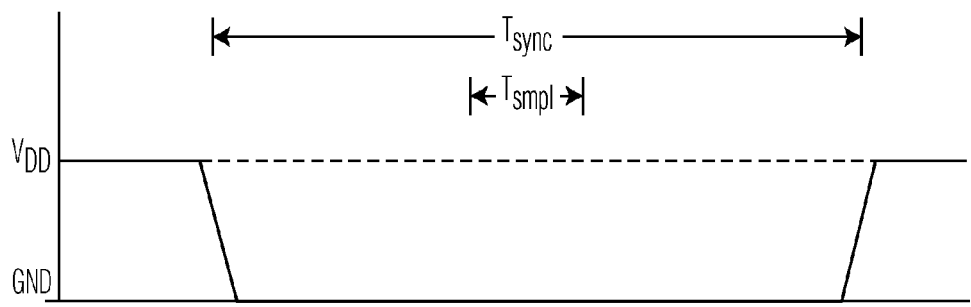
FIG. 7 depicts a voltage versus time graph of a data bit according to a time synchronization protocol.

FIG. 7 depicts a voltage versus time graph of a data bit according to the time synchronization protocol. In an embodiment, the time of a bit, $T_{sync}$, is the time that was determined during the synchronization byte transmission and the time, $T_{sample}$, is the time at which the receiving device samples the bit. In the embodiment of FIG. 7, $T_{sample}=V_{DD}$ indicates a "1" bit and $T_{sample}=GND$ indicates a "0" bit. Using the time synchronization protocol, data bits are sampled at $T_{sample}$ that was resolved when the master I2C device sent the sync word.

Figure 8:
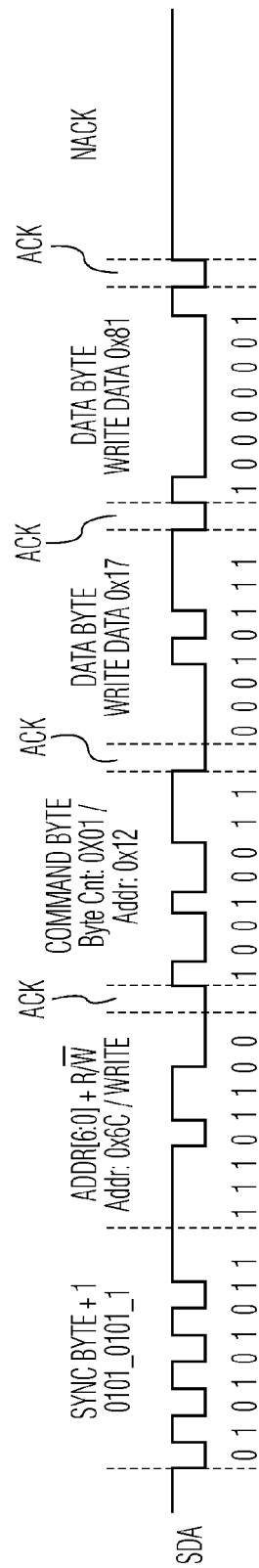
FIG. 8 depicts an expanded bit level view of an I2C write operation using a single-line I2C bus with time synchronization in accordance with an embodiment of the invention.

FIG. 8 depicts an expanded bit level view of the I2C write operation of FIG. 3A using a single-line I2C bus with time synchronization in accordance with an embodiment of the invention. In the example of FIG. 8, the master I2C device writes to address 0x6C, register 0x12 with data byte 0x17 and to register 0x13 with data byte 0x81. The ACKs are driven by the slave I2C device. For a one byte write, the I2C frame is the same except for the number of data bytes and corresponding ACKs.

In an embodiment, a read operation does not require a command/pointer register byte because the read operation can use the address in the read pointer. The read pointer can be written with the address of any write command or by specifying a "write to read pointer" bit in the command byte. This general approach to reading in an I2C system is described in the I2C specification.

Figure 9A:
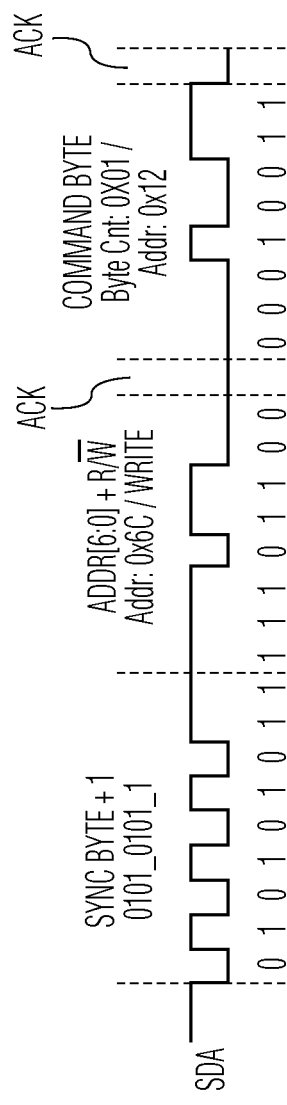
FIGS. 9A and 9B depict expanded bit level views of I2C data in a read operation with a single-line I2C bus using time synchronization.
Figure 9B:
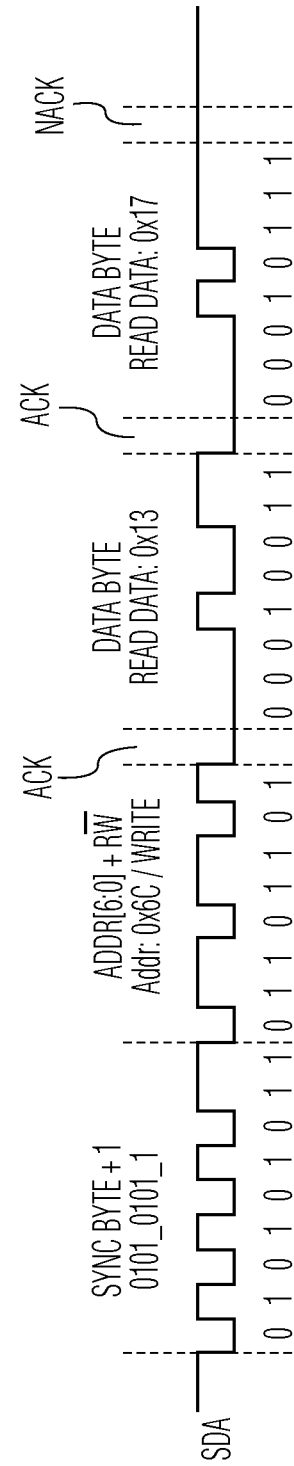

FIGS. 9A and 9B depict expanded bit level views of I2C communications that are used to implement a read operation on a single-line I2C bus using time synchronization. The I2C communications depicted in FIG. 9A implement a write operation in which the master I2C device writes the read pointer of a slave I2C device by setting bit [6] of the command/register pointer byte to "1."

After completing the write, the master I2C device starts another communication by transmitting a sync word and slave address+read byte to the slave I2C device. The slave I2C device then returns the requested data bytes. FIG. 9B depicts I2C communications to implement a read operation in which two bytes are read from a slave I2C device. In particular, data bytes 0x13 and 0x17 are read from register 0x12 of the slave I2C device having slave address 0x6C. In the embodiment of FIG. 9B, the master I2C device ACKs the first byte, thus triggering transmission of the second byte. The NACK after the second byte ends the read operation.

Figure 10:
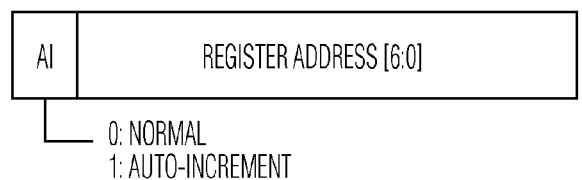
FIG. 10 depicts an expanded view of the command/pointer register byte field of the write operation from FIG. 3A for use with an edge synchronization protocol.

FIG. 10 depicts an expanded view of the command/pointer register byte field of the write data 230 from FIG. 3A for use with an edge synchronization protocol. As shown in FIG. 10, bits [6:0] are used to carry the register address to which data will be written and bit [7] carries an Auto-Increment command (AI), where 0=Normal (read from the identified register address), and 1=Auto-increment (increment the register address for each byte). When writing or reading from a slave I2C device, the master I2C device can choose to do a "normal" or "auto-increment" transfer in the edge synchronization mode. When data bytes are sent or requested continuously in normal mode, the data will access the same register address. In auto-increment mode, the additional data bytes will be written or read from the next sequential register address. For example, in the case in which the master I2C device writes to register 0x02 with data bytes 0x24, 0x25, 0x26, 0x27, in normal mode, register 0x02 will be written with 0x24, 0x25, 0x26, and 0x27. Each data byte overwrites the previous data in register 0x02. However, in auto-increment mode, the register address is incremented such that register 0x02 is written with 0x24, register 0x03 is written with 0x25, register 0x04 is written with 0x26, and register 0x05 is written with 0x27.

Figure 11:
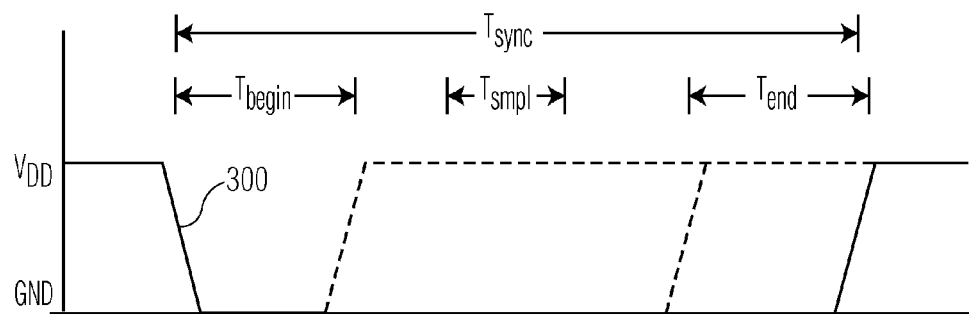
FIG. 11 depicts a voltage versus time graph of a data bit according to an edge synchronization protocol.

FIG. 11 depicts a voltage versus time graph of a data bit according to the edge synchronization protocol. In an embodiment, $T_{sync}$ is the length of a data bit after the SDA line falls from VDD to GND to signify a bit start. In an embodiment, the edge synchronization protocol requires that a negative pulse 300 (or negative edge, "negedge") always occur before sending out a data bit. Following a period of time, $T_{begin}$, the transmitting device raises the voltage on the SDA line to $V_{DD}$ to indicate a "1" or keeps the voltage on the SDA line at ground (GND) to indicate a "0." The slave will sample at the time, $T_{sample}$, which is defined as $T_{sample}=T_{sync}/2$. In an embodiment, the time, $T_{end}$, is only restricted by keeping the voltage of the SDA line at $V_{DD}$ long enough for the slave device to recognize a negative edge (negedge) on the SDA line for the next bit.

When using edge synchronization, the receiver will always wait for a negative edge to receive data. Therefore, the master I2C device may hold SDA high to stretch out timing.

FIG. 12 depicts an expanded bit level view of the I2C write operation of FIG. 3A using a single-line I2C bus with edge synchronization in accordance with an embodiment of the invention. In the example of FIG. 12, the master I2C device writes to address 0x6C, register 0x12 with data byte 0x17. The ACKs are driven by the slave I2C device. For a multiple byte write, the frame is the same except for the number of data bytes.

As described above, a read does not require a command/pointer register byte because the read operation can use the address in the read pointer. The read pointer can be written with the address of any write command or by specifying a "write to read pointer" bit in the command byte. This general approach to reading in an I2C system is described in the I2C specification.

FIGS. 13A and 13B depict expanded bit level views of I2C communications that are used to implement a read operation on a single-line I2C bus using edge synchronization. The I2C communications depicted in FIG. 13A implement a write operation in which the master I2C device writes the read pointer of a slave I2C device by setting bit [6] of the command/register pointer byte to "1."

After completing the write operation, the master I2C device starts another communication by transmitting a sync word and slave address+read byte to the slave I2C device. The slave I2C device then returns the requested data byte or bytes. FIG. 13B depicts I2C communications to implement a read operation in which one byte is read from a slave I2C device. In particular, data byte 0x17 is read from the slave I2C device having slave address 0x6C. In the embodiment of FIG. 13B, the master I2C device NACKs the first byte, thus triggering a STOP command. Multiple bytes can be read before a NACK.

Edge synchronization provides a robust synchronization method because clock drift is eliminated. Faster transfer rates can be achieved using edge synchronization.

Figure 14:
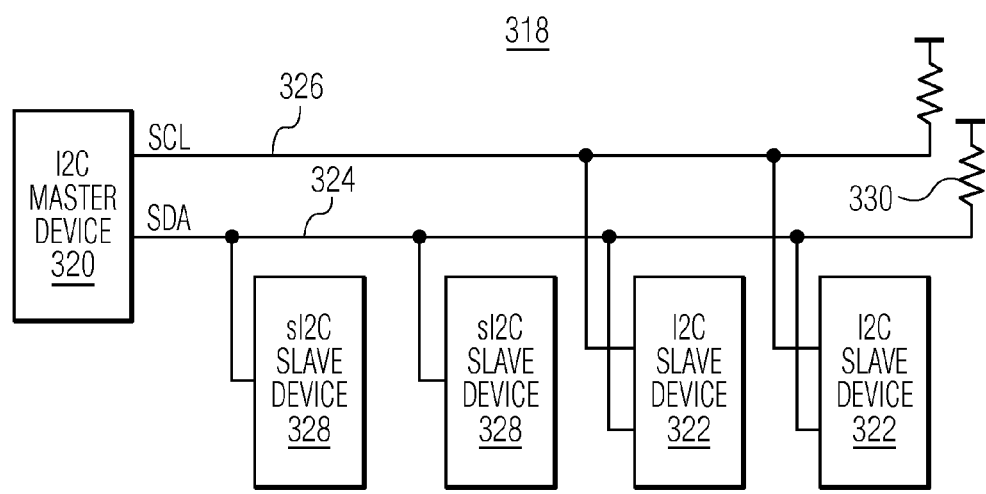
FIG. 14 depicts a hybrid I2C communication system in which a master I2C device is connected to two slave I2C devices by both an SDA line and an SCL line, and connected to two other slave I2C devices by only the SDA line.

As described above, the single-line I2C bus protocol is backwards compatible with the two-line I2C bus protocol. FIG. 14 depicts a hybrid I2C communications system 318 in which a master I2C device 320 is connected to two slave I2C devices 322 by both the SDA line 324 and the SCL line 326 (a two-line I2C bus), and connected to two other slave I2C devices 328 by only the SDA line (a single-line I2C bus). In particular, slave I2C devices 322 are connected to the master I2C device by both the SDA line and the SCL line and communicate via the two-line I2C bus protocol and the slave I2C devices 328 are connected to the master I2C device by only the SDA line and communicate via the single-line I2C bus protocol. In an embodiment, the single-line slave I2C devices 328 use an open drain input/output to ACK or transmit data back to the master I2C device. To send an ACK to the master I2C device, the slave I2C device will pull the line to ground (GND). To send a "1" or release the SDA line, the slave I2C device stops the pulldown to ground and allows a pullup resistor 330 on the SDA line to pull the line to VDD.

In an embodiment, the time synchronization method is applicable for clock frequencies up to 400 kHz (e.g., 100-400 kbits/sec) and the edge synchronization technique is applicable for clock frequencies up to 1 MHz (e.g., 1 Mbits/sec) in normal mode and up to 3.4 MHz (e.g., 3.4 Mbits/sec) in high-speed mode (HS-Mode).

Time synchronization or edge synchronization can be a fixed characteristic of the master and/or slave I2C devices or the synchronization protocol can be programmable and/or selectable within the respective I2C devices.

Table 1 provides a summary of some of the features of the time synchronization and edge synchronization approaches to the single-line I2C bus.

TABLE 1

|  | Time Sync | Edge Sync |
| --- | --- | --- |
| I2C Backward Compatibility | Bits are similar to SDA of I2C Bus | Must be a negative edge on SDA before each bit transfer |
| Clock Stretching | None | Can stretch by holding SDA high |
| Frequency | 400 KHz | 1 MHz<br>3.4 MHz (HS-Mode) |
| STOP | Hold SDA high for 9 bit lengths | Hold SDA low for 2 bit lengths |
| Auto-increment | 2 bytes | All registers |

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods described herein may be implemented using software instructions stored on a computer useable storage medium for execution by a computer. As an example, an embodiment of a computer program product includes a computer useable storage medium to store a computer readable program.

The computer-useable or computer-readable storage medium can be an electronic, magnetic, optical, electromagnetic, infrared, or semiconductor system (or apparatus or device). Examples of non-transitory computer-useable and computer-readable storage media include a semiconductor or solid state memory, magnetic tape, a removable computer diskette, a random access memory (RAM), a read-only memory (ROM), a rigid magnetic disk, and an optical disk.

Current examples of optical disks include a compact disk with read only memory (CD-ROM), a compact disk with read/write (CD-R/W), and a digital video disk (DVD).

Alternatively, embodiments of the invention may be implemented entirely in hardware or in an implementation containing both hardware and software elements. In embodiments which use software, the software may include but is not limited to firmware, resident software, microcode, etc.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. An inter-integrated circuit (I2C) compatible device comprising:
    a serial data line (SDA) interface for connection to an SDA line of a bus;
    a single-line I2C module configured to:
    transmit a sync word from the SDA interface over the SDA line of the bus, wherein the sync word is a SYNC BYTE+Not Acknowledge (NACK) bit; and
    following transmission of the sync word, transmit I2C data from the SDA interface over the SDA line of the bus such that digital data is communicated over the bus via a single line, wherein the next byte that is transmitted from the SDA interface over the SDA line of the bus following the sync word is a 7 bit slave address plus a data direction bit formatted according to the I2C specification, wherein the data direction bit indicates either a write operation or a read operation.

2. The I2C compatible device of claim 1, wherein the I2C compatible device is a master I2C device.

3. The I2C compatible device of claim 1, wherein the sync word is a 010101011 bit stream with the SDA line initially held high.

4. The I2C compatible device of claim 1, wherein the single-line I2C module is configured to transmit the sync word and the I2C data according to a time synchronization protocol.

5. The I2C compatible device of claim 1, wherein the single-line I2C module is configured to transmit the sync word and the I2C data according to an edge synchronization protocol.

6. An inter-integrated circuit (I2C) compatible device comprising:
    an SDA interface for connection to an SDA line of a bus;
    a single-line I2C module configured to:
    recognize a sync word in digital data received at the SDA interface via the SDA line of the bus, wherein the sync word is a SYNC BYTE+Not Acknowledge (NACK) bit; and
    upon recognizing the sync word, decode the received digital data as I2C data, wherein the next byte that is received at the SDA interface via the SDA line of the bus following the sync word is decoded as a 7 bit slave address plus a data direction bit formatted according to the I2C specification, wherein the data direction bit indicates either a write operation or a read operation.

7. The I2C compatible device of claim 6, wherein the I2C compatible device is a slave I2C device.

8. The I2C compatible device of claim 6, wherein the sync word is a 010101011 bit stream with the SDA line initially held high.

9. The I2C compatible device of claim 6, wherein the single-line I2C module is configured to decode the sync word and the I2C data according to a time synchronization protocol.

10. The I2C compatible device of claim 6, wherein the single-line I2C module is configured to decode the sync word and the I2C data according to an edge synchronization protocol.

11. The I2C compatible device of claim 6 wherein the I2C compatible device is backwards compatible with the two-line I2C specification, which uses both SDA and serial clock line (SCL) lines.

12. A method for communicating digital data between a master and a slave over a single line of a bus, the method comprising:
    transmitting a sync word over the single line of the bus, wherein the sync word is a SYNC BYTE+Not Acknowledge (NACK) bit;
    following transmission of the sync word, transmitting I2C data over the single line of the bus, wherein the next byte that is transmitted over the single line of the bus following the sync word is a 7 bit slave address plus a data direction bit formatted according to the I2C specification, wherein the data direction bit indicates either a write operation or a read operation.

13. The method of claim 12 further comprising, receiving the sync word, recognizing the sync word, and decoding the I2C data upon recognizing the sync word, wherein the next byte that is received via the single line of the bus following the sync word is decoded as a 7 bit slave address plus a data direction bit formatted according to the I2C specification, wherein the data direction bit indicates either a write operation or a read operation.

14. The method of claim 12 wherein the sync word and I2C data are transmitted according to a time synchronization protocol.

15. The method of claim 12 wherein the sync word and I2C data are transmitted according to an edge synchronization protocol.

* * * * *